Sept. 20, 1949. G. G. HAUPTMAN 2,482,585
COMBINATION BICYCLE AND BABY CARRIAGE
Filed Jan. 15, 1946

INVENTOR.
GERHARD G. HAUPTMAN
BY
Howard E. Thompson

Patented Sept. 20, 1949

2,482,585

UNITED STATES PATENT OFFICE 2,482,585

COMBINATION BICYCLE AND BABY CARRIAGE

Gerhard G. Hauptman, New York, N. Y.

Application January 15, 1946, Serial No. 641,239

3 Claims. (Cl. 280—202)

This invention relates to what are generally known as bicycles. More particularly, the invention deals with vehicles of this class, wherein the bicycle frame is formed of a seat wheel section and a handle bar wheel section, the sections being detachably coupled, whereby the seat wheel section is adapted for attachment to an adaptor coupling on a baby carriage and, whereby, the baby carriage may be propelled through the drive mechanism of the seat wheel section. The novel features of the invention will be best understood from the following description, when taken together with the accompanying drawing, in which certain embodiments of the invention are disclosed and, in which, the separate parts are designated by suitable reference characters in each of the views and, in which:

Figure 5:
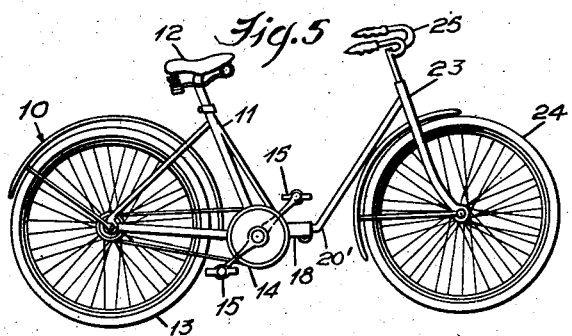
Fig. 5 is a diagrammatic side view showing the two parts or sections of the bicycle in assembled relationship.

Considering Fig. 5 of the drawing, 10 represents a drive or seat section of a bicycle comprising a suitable frame 11, a seat 12, wheel 13, sprocket and chain drive 14 actuated through crank pedals 15, as in the usual structures of vehicles of this type and kind.

The frame 11 has a short lower extension 16, the end of which has a section removed to form a projecting key member 17. To the end portion 16 and extending beyond the key member 17 is welded or otherwise secured a coupling sleeve 18. The sleeve 18 forms a socket 19 for the reception of a rod 20 having, at its free end, a projecting key member 21, cooperating with the key 17 to maintain the parts against relative rotation one upon the other. The coupling sleeve 18 has a suitable winged or other set screw 22 to retain the parts in coupled relationship. It will be apparent that the key members 17 and 21 comprise half sections of rods or tubes, from which the vehicle or the adaptor unit of a vehicle is constructed.

Figure 1:
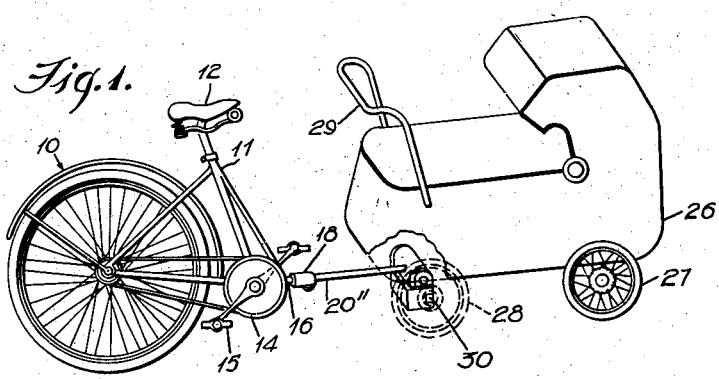
Fig. 1 is a diagrammatic side and perspective view showing my combination wheel and baby carriage structure.
Figure 2:
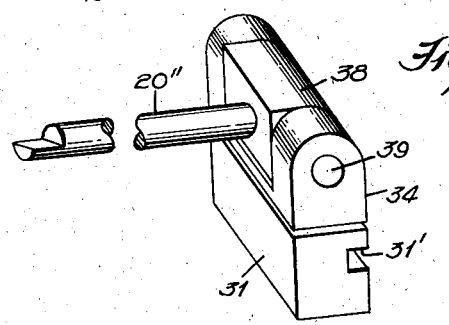
Fig. 2 is a perspective detail view of part of the adaptor unit which I employ detached.
Figure 3:
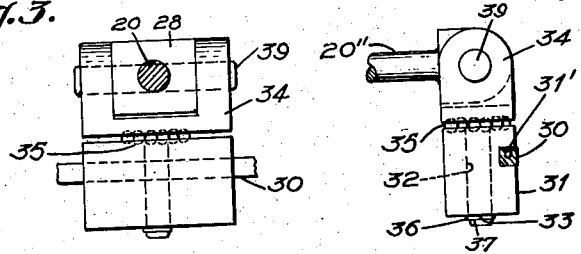
Fig. 3 is a face view of the unit shown in Fig. 2 looking from left to right of Fig. 2, and indicating part of the carriage axle.
Figure 6:
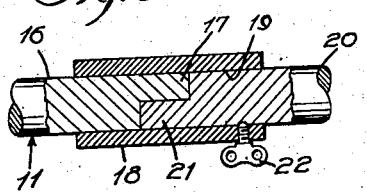
Fig. 6 is a longitudinal sectional view through the coupling employed between the seat or drive section and the front wheel or carriage sections.

The showing in Fig. 6 of the drawing is applicable to the showing of the vehicle combinations as in Figs. 1 and 5, thus, in Fig. 5, the frame part 20' corresponds to the part 20 of Fig. 6 and, in Fig. 1, the part 20'' corresponds to the part 20 of Fig. 6. The part 20' comprises an extension on the front frame 23 of a bicycle, in which is mounted the front wheel 24 and handle bars 25 in accordance with conventional practice in bicycle construction. As my invention is not concerned with the specific structure of the bicycle or its parts aside from the detachable coupling between the parts or sections, no detail description thereof is herein given.

Figure 4:
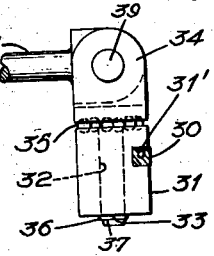
Fig. 4 is a side view of the structure as shown in Fig. 3.

In Fig. 1 of the drawing I have shown diagrammatically at 26 a baby carriage having pairs of front wheels 27 and rear wheels 28 only one of the wheels 28 being shown in dotted lines in said figure. It is readily understood that conventional characters of the type shown have pairs of front and rear wheels and the rear wheels are omitted to simplify the showing. At 29 is shown the handle of the carriage which, in the assemblage with the rear section 10 of the bicycle, as shown, forms the handle bars of the vehicle combination disclosed. At 30 is shown the rear axle of the baby carriage 26. To this axle is fixedly or otherwise secured an elongated block 31, note Fig. 4. The block 31 has a longitudinal channel 31' for receiving the axle 30.

The block 31 has centrally thereof a vertical bore 32, in which is mounted a downwardly directed shaft or trunnion 33 of a fork-shaped coupling 34. Between the cross-head of the coupling 34 and the block 31 and around the shaft 33 is a suitable ball bearing 35. A split ring 36 is mounted on the shaft 33 below the block 31 to hold the parts 31, 34 in assembled relationship, the ring 36 seating in a groove 37 in the shaft 33.

The block 31, including the coupling 34, constitutes part of an adaptor unit for coupling the baby carriage with the drive section 10 of the bicycle. The remainder of this unit comprises the rod 20'', including the enlarged head 38 at its end pivotally secured in the fork-shaped coupling by a pivot pin 39.

It will be apparent that the adaptor unit forms what might be termed a unitable coupling of the drive section of the bicycle with the baby carriage axle so that, as the baby carriage is propelled by the drive section, the carriage 26 may be tilted to raise the front wheels 27 off from the ground and, at the same time, the carriage may be swung on the vehicle axle 33 in directing the tandem combination of carriage and bicycle in any direction over a roadway.

From the foregoing, it will be apparent that the combination vehicles disclosed may be interchanged from time to time, so as to provide a two-wheel bicycle usable as such and a bicycle propelled baby carriage. In other words, after the baby carriage has served its purpose and function, the bicycle becomes usable at all times as an ordinary bicycle. It will thus be apparent that, in merchandising the combination vehicle, the bicycle will be constructed of the front and rear sections detachably coupled one with respect to the other and with this combination will be sold the adaptor unit, or this unit may be purchased at any desirable time and all that will be necessary to do is to attach or mount the adaptor unit on the baby carriage. On the other hand, the carriage may be constructed with an adaptor or coupling as a part thereof, depending entirely upon the merchandising program selected. In other words, the vehicle combination as disclosed in Fig. 1 may be sold as such and, together with this sale, the front wheel unit may also be purchased or the front wheel unit acquired at any other time.

In most instances, a baby carriage has a limited period use in the average home and, from this standpoint, the drive or propelling section of the carriage combination can be converted into a bicycle usable by the infant at a mature date.

Having fully described my invention, what I claim as new and desire to secure by Letters Patent is:

1. The combination with a baby carriage, of an adaptor coupling attached to part of the carriage frame adjacent one pair of wheels of the carriage frame, means at one end of said coupling forming a universal mounting on the carriage frame, a drive wheel and seat section having a coupling socket, and the other end of said adaptor coupling and the coupling socket having interengaging means keying and retaining the adaptor coupling with said drive wheel and seat section.

2. The combination with a baby carriage, of a seat frame, a drive wheel in the seat frame, manually actuated means in the seat frame and actuating said drive wheel in propelling the carriage over a surface, the frame adjacent said drive wheel having a coupling socket, an adaptor unit, means at one end of said unit attached to the carriage providing swinging and tilting of the carriage with respect to the seat frame, and the other end of said unit having means engaging the coupling socket to retain the adaptor unit against rotation and detachment with respect to the seat frame.

3. In a combination baby carriage and seat and drive frame, an adaptor unit for coupling the carriage with the seat and drive frame, said unit comprising a rod, one end of which is fashioned to form a coupling with the seat and drive frame, the other end of the rod terminating in an enlarged cross-head, a fork-shaped coupling pivoted to the ends of said cross-head, said coupling having a downwardly extending trunnion centrally thereof forming a pivot axis, an elongated block in which said trunnion is mounted for rotation thereby providing rotary movement of the coupling in said block and swinging movement of the cross-head in said coupling in providing a universal mounting at said end of the adaptor unit rod, and said block having means for engaging a part of the carriage frame.

GERHARD G. HAUPTMAN.

REFERENCES CITED

The following references are of record in the file of this patent:

UNITED STATES PATENTS

| Number | Name | Date |
| --- | --- | --- |
| 672,620 | Horton | Apr. 23, 1901 |
| 681,911 | Genzlinger | Sept. 3, 1901 |

FOREIGN PATENTS

| Number | Country | Date |
| --- | --- | --- |
| 387,593 | France | July 17, 1908 |
| 482,082 | Great Britain | Mar. 23, 1938 |
| 575,902 | France | Aug. 8, 1924 |